(12) United States Patent
Moore et al.

(10) Patent No.: US 9,097,015 B2
(45) Date of Patent: Aug. 4, 2015

(54) RESIN PANELS WITH EMBEDDED STRUCTURED-CORES AND METHODS OF MAKING THE SAME

(71) Applicant: 3form, LLC, Salt Lake City, UT (US)

(72) Inventors: Charles H. Moore, Salt Lake City, UT (US); Matthew T. Sutton, Salt Lake City, UT (US); John E. C. Willham, Sandy, UT (US)

(73) Assignee: 3form, LLC, Salt Lake City, UT (US)

( * ) Notice: Subject to any disclaimer, the term of this patent is extended or adjusted under 35 U.S.C. 154(b) by 0 days.

(21) Appl. No.: 14/351,061

(22) PCT Filed: Oct. 11, 2012

(86) PCT No.: PCT/US2012/059824
§ 371 (c)(1),
(2) Date: Apr. 10, 2014

(87) PCT Pub. No.: WO2013/055968
PCT Pub. Date: Apr. 18, 2013

(65) Prior Publication Data
US 2014/0283472 A1      Sep. 25, 2014

Related U.S. Application Data

(60) Provisional application No. 61/546,456, filed on Oct. 12, 2011.

(51) Int. Cl.
*E04C 2/26* (2006.01)
*B29C 70/42* (2006.01)
(Continued)

(52) U.S. Cl.
CPC . *E04C 2/26* (2013.01); *B29C 70/42* (2013.01); *E04C 2/205* (2013.01); *E04F 15/02429* (2013.01)

(58) Field of Classification Search
CPC ............... E04C 2/26; E04C 2/32; E04C 2/36; E04C 2/54; E04C 2/292; E04G 23/02
USPC ............. 52/408, 409, 411, 412, 309.1, 309.3, 52/309.4, 309.5, 309.6, 309.13–309.15
See application file for complete search history.

(56) References Cited

U.S. PATENT DOCUMENTS 2,785,286 A    3/1957   Lichtgarn
3,103,042 A *  9/1963   Martin ........................... 428/74
(Continued)

FOREIGN PATENT DOCUMENTS

EP    0857244    8/2000
JP    3019464    10/1995
(Continued)

OTHER PUBLICATIONS

International Search Report and Written Opinion from PCT/US2012/059824. Dated Feb. 28, 2013.
(Continued)

*Primary Examiner* — Mark Wendell
*Assistant Examiner* — Keith Minter
(74) *Attorney, Agent, or Firm* — Workman Nydegger

(57) ABSTRACT

An architectural panel comprises a structured core embedded in a resin material such that the resin material fills the cells of the structured core. In at least one implementation, a method of making the panel comprises pressing two or more resin substrates about the structured core at a pressure and temperature such that the resin substrates flow into and fill the cells of the structured core. In at least one other implementation, a method of making the panel comprises placing the structured core into a form, pouring a liquid resin material into the form, and allowing the resin material to harden.

18 Claims, 7 Drawing Sheets

(51) Int. Cl.
    *E04C 2/20*        (2006.01)
    *E04F 15/024*      (2006.01)

(56) References Cited

U.S. PATENT DOCUMENTS

| | | | |
|---|---|---|---|
| 3,379,603 A | 4/1968 | Barnette | |
| 3,676,267 A | 7/1972 | Fairbanks | |
| 3,676,276 A | 7/1972 | Hirshen | |
| 3,847,701 A | 11/1974 | Fairbanks | |
| 3,936,565 A | 2/1976 | Good | |
| 4,061,812 A | 12/1977 | Gilwee | |
| 4,249,976 A | 2/1981 | Hudson | |
| 4,315,050 A | 2/1982 | Rourke | |
| 4,475,624 A | 10/1984 | Bourland | |
| 4,581,867 A * | 4/1986 | Crowley | 52/378 |
| 4,728,566 A | 3/1988 | Lancaster | |
| 4,902,365 A | 2/1990 | Westlake | |
| 4,925,721 A | 5/1990 | Harper-Tervet | |
| 5,032,443 A | 7/1991 | Rietdijk | |
| 5,096,526 A | 3/1992 | Engwall | |
| 5,139,596 A * | 8/1992 | Fell | 156/205 |
| 5,186,999 A | 2/1993 | Brambach | |
| 5,192,482 A | 3/1993 | Brambach | |
| 5,316,604 A | 5/1994 | Fell | |
| 5,328,744 A | 7/1994 | Kaufmann | |
| 5,895,701 A | 4/1999 | Givoni | |
| 6,039,832 A | 3/2000 | McCarville | |
| 6,107,976 A | 8/2000 | Purinton | |
| 6,500,516 B2 | 12/2002 | Bourlier | |
| 6,630,221 B1 | 10/2003 | Wong | |
| 6,673,415 B1 | 1/2004 | Yamazaki et al. | |
| 6,730,386 B1 | 5/2004 | Stahlke | |
| 7,281,353 B2 | 10/2007 | Konstantin | |
| 8,070,994 B2 * | 12/2011 | Carlson et al. | 264/46.5 |
| 2001/0042593 A1 | 11/2001 | Zhou | |
| 2005/0003148 A1 | 1/2005 | Myles | |
| 2005/0136198 A1 | 6/2005 | Bourlier | |
| 2006/0134408 A1 | 6/2006 | Kaneko | |
| 2007/0132278 A1 | 6/2007 | Lester | |
| 2008/0086982 A1 * | 4/2008 | Parenteau et al. | 52/794.1 |
| 2008/0131661 A1 | 6/2008 | Albers | |
| 2010/0062211 A1 | 3/2010 | Kawazoe | |
| 2010/0307063 A1 | 12/2010 | Bouthillier | |
| 2012/0048451 A1 | 3/2012 | Carlson | |
| 2012/0048487 A1 * | 3/2012 | Brewster et al. | 160/368.1 |
| 2012/0164367 A1 | 6/2012 | Delmas | |
| 2014/0000193 A1 * | 1/2014 | Daniels et al. | 52/232 |
| 2014/0013691 A1 * | 1/2014 | Brewster et al. | 52/309.13 |

FOREIGN PATENT DOCUMENTS

| | | |
|---|---|---|
| JP | 2753631 | 5/1998 |
| JP | 2934048 | 8/1999 |
| JP | 2006083507 | 3/2006 |
| JP | 2006-289678 | 10/2006 |
| KR | 200414348 | 4/2006 |
| KR | 20-0431041 | 11/2006 |
| KR | 10-2010-0021174 | 2/2010 |
| WO | WO2004076167 | 9/2004 |

OTHER PUBLICATIONS

International Search Report and Opinion of PCT/US2010/034349, Mailed Jan. 24, 2011.

Owens Corning Uniconform; Sep. 15, 2010 Accessed Jan. 9, 2015 from http://owenscorning. mediaroom.com/index.php?s=2370 &item=13544.

KEMI Swedish Chemicals Agency; Bishpenol A (BPA); accessed Jan. 9, 2015 from https://www.kemi.se/en/Content/In-focus/Bisphenol-A/.

* cited by examiner

RESIN PANELS WITH EMBEDDED STRUCTURED-CORES AND METHODS OF MAKING THE SAME

CROSS-REFERENCE TO RELATED APPLICATIONS

The present invention is a 35 U.S.C. §371 U.S. National Stage of PCT Application No. PCT/US2012/059824 filed Oct. 11, 2012, entitled "Resin Panels with Embedded Structured-Cores and Methods of Making the Same" which claims the benefit of priority to U.S. Provisional Application No. 61/546,456, filed Oct. 12, 2011, entitled "Resin panel having an embedded structured-cores." The entire content of each of the aforementioned patent applications is incorporated herein by reference.

BACKGROUND OF THE INVENTION

1. The Field of the Invention

This invention relates generally to resin panels including embedded structured-cores, which can serve structural and/or aesthetic purposes. This invention also relates to methods of forming resin panels including embedded structured-cores.

2. Background and Relevant Art

Recent trends in building design involve using one or more sets of decorative panels to add to the functional and/or aesthetic characteristics of a given structure or design space. These recent trends are due, at least in part, because there is sometimes more flexibility with how the given panel (or set of panels) is designed, compared with the original structure. For example, recent panel materials include synthetic, polymeric resin materials, which can be formed as panels to be used as partitions, walls, barriers, treatments, décor, etc. Examples of such resin materials include polyvinyl chloride or "PVC"; polyacrylate materials such as poly(methyl methacrylate) or "PMMA"; polyester materials such as poly(ethylene-co-cyclohexane 1,4-dimethanol terephthalate), or "PET"; poly(ethylene-co-cyclohexane 1,4-dimethanol terephthalate glycol) or "PETG"; glycol modified polycyclohexylenedimethlene terephthalate; or "PCTG"; as well as polycarbonate (or "PC") materials.

In general, resin materials such as these are now popular compared with decorative cast or laminated glass materials, since resin materials may be manufactured to be more resilient and to have a similar transparent, translucent, or decorative appearance as cast or laminated glass, but with less cost. Decorative resins can also provide more flexibility compared with glass at least in terms of color, degree of texture, gauge, impact resistance, and ease of fabrication.

One particular type of resin panel that is now popular is honeycomb-core panels. Honeycomb-core panels include a honeycomb core bonded or interlocked between two outer sheets or skins. Such panels are popular because the core reduces the overall weight of the panel, while also increasing the strength of the panel. Furthermore, the honeycomb core can provide a unique aesthetic.

Conventional mechanisms for creating honeycomb core panels involve laminating a structured, or honeycomb core between two or more substrate panels with an adhesive. The manufacturer may use either liquid or solid adhesive to bond the core to the substrate panels. Both liquid and solid adhesives typically rely primarily on chemical bonding. Chemical bonds can fail, leading to delamination of the panel.

In the case of liquid adhesive, the manufacturer may spread or spray the adhesive on both sides of a honeycomb core or on a single side of each substrate panel, and then apply the panel directly to the core. The strength of the bond is often dependent upon the uniformity of the liquid adhesive application. Bubbles, voids, and debris can interrupt the uniformity of adhesive application, increasing the risk of delamination of the panel and reducing bond strength between the skin (i.e., outer substrates) of the assembly and the core.

Of particular issue are situations where there are significant material dissimilarities between materials to be bonded or joined. Consider thermoplastic resins and metals for example. Thermoplastics and metals have vastly different chemistries and surface properties. Furthermore, adhesives typically suited to bond one material are often not suitable to create adhesion for the other. As such, there are limited choices of adhesives that can create an adequate bond between such materials. Unfortunately, often these limited choices of adhesives may affect the desired aesthetic of the finished product, such as color or clarity of the panel.

Similarly, in the case of solid adhesives, such as elastomeric films, contamination may reduce the strength of the bond. The manufacturer may first attach a solid adhesive resin film on one side of the substrate panel and then in a second step adhere the substrate panel to the honeycomb core. Solid adhesive does not necessarily bond the substrates together more strongly than liquid adhesive. Lastly, solid adhesives tend to be expensive and the additional processing steps associated therewith increase the chances for reduced product yield due to entrapped contaminants (dirt, debris, air, etc.) to the exposed adhesive portion of the skin material. This contamination can increase the risk of separation in the final panel.

One will appreciate that there are many disadvantages in the art of producing core panels particularly when use of adhesives is not practical or desirable.

BRIEF SUMMARY OF THE INVENTION

Implementations of the present invention solve one or more of the foregoing, or other, problems in the art with resin panels including embedded structured-cores and systems, methods, and apparatus configured to produce the same in an efficient, reliable manner. Specifically, one or more implementations of the present invention include a structured-core, such as a metallic core, embedded in a resin material. In particular, the resin material can fill cells in the core. Furthermore, one or more implementations of the present invention include a unitary panel that provides the aesthetic effect of the structured core being suspended within the resin material of the panel. Additionally, the panel may be less subject to risk of delamination or material separation.

For example, one implementation of a resin panel includes a structured core having a plurality of cells. The resin panel further includes a resin material surrounding the structured core and occupying space inside the cells of the structured core. Additionally, the structured core appears to be suspended in the resin material.

Furthermore, a method for creating a resin panel involves providing a structured core having a plurality of cells. The plurality of cells includes one or more cells positioned at an outer edge of the structured core and one or more cells positioned within the structured core. The method further involves providing a resin material and introducing the resin material into the one or more cells positioned within the structured core such that the resin material occupies at least a majority of the space inside the one or more cells positioned within the structured core. The method further involves surrounding the structured core with resin material and allowing the resin material to harden to form a unitary panel.

In addition to the foregoing, a panel system includes one or more translucent resin panels. Each translucent resin panel includes a structured core comprising a plurality of cells. The plurality of cells comprises one or more cells positioned in the center of the structured core. Each translucent resin panel further includes resin material. The resin material surrounds the structured core and at least partially fills the one or more cells positioned at the center of the structured core. The system further includes a mounting system that secures the one or more translucent resin panels to a support structure.

This summary is provided to introduce a selection of concepts in a simplified form that are further described below in the Detailed Description. This Summary is not intended to identify key features or essential features of the claimed subject matter, nor is this summary intended as an aid in determining the scope of the claimed subject matter.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
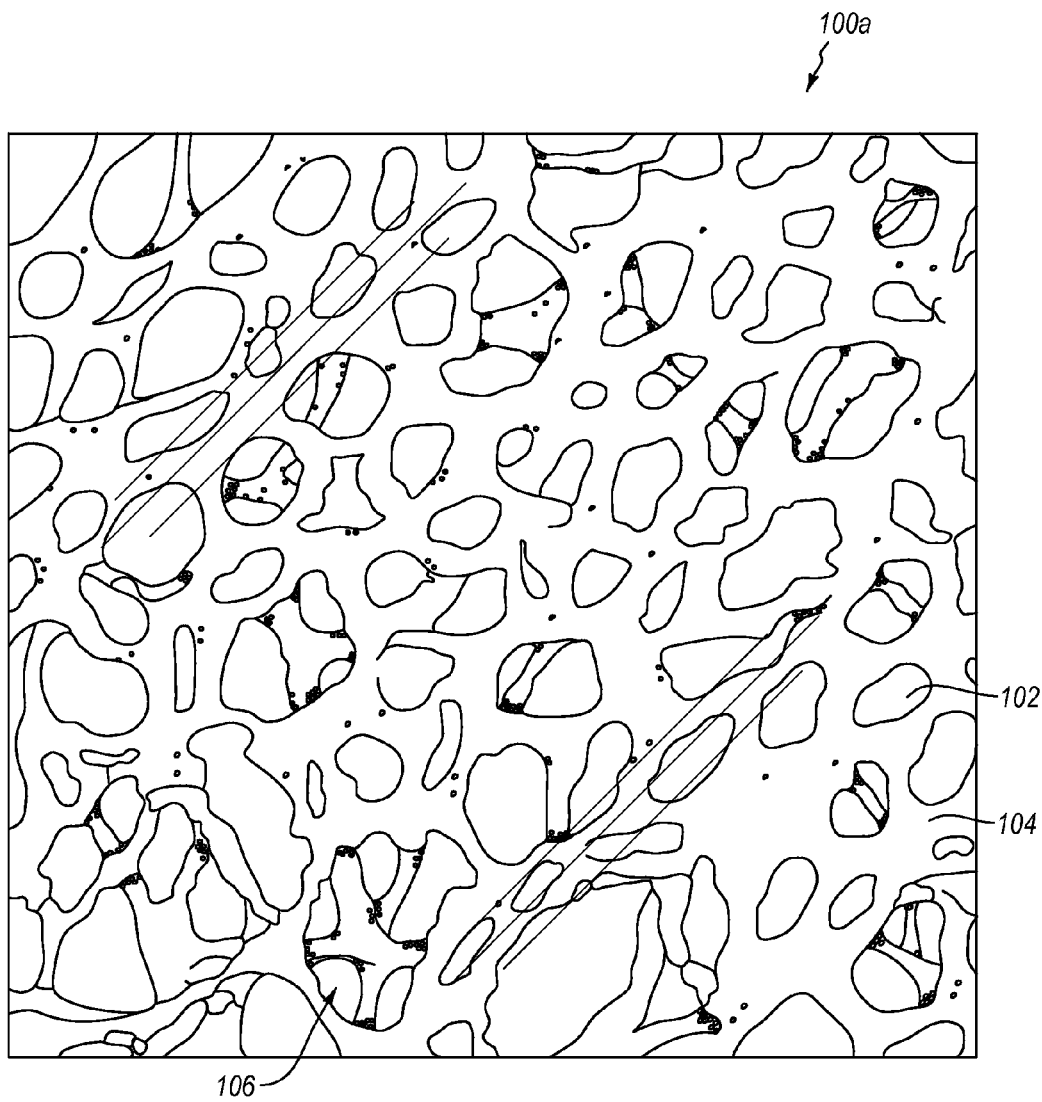
FIG. 1A illustrates a facing view of a resin panel with an embedded structured-core in accordance with one or more implementations of the present invention.

One or more implementations of the present invention include resin panels including embedded structured-cores and systems, methods, and apparatus configured to produce the same in an efficient, reliable manner. Specifically, one or more implementations of the present invention include a structured-core, such as a metallic core, embedded in a resin material. In particular, the resin material can fill cells in the core. Furthermore, one or more implementations of the present invention include a unitary panel that provides the aesthetic effect of the structured core being suspended within the resin material of the panel. Additionally, the panel may be less subject to risk of delamination or material separation.

In general, and as understood more fully herein, a manufacturer can create a decorative panel by causing a resin material to flow into and fill the cells in a structured (or honeycomb) core, thereby embedding the structured core in the resin material. The resin material may fill all, nearly all, or a majority of the space inside the cells of the structured core. In at least one implementation, the resin material comprises two or more resin substrates, which the manufacturer melts and causes to flow into the structured core. In at least one other implementation, the resin material is a thermoset liquid, which the manufacturer pours into a form containing the structured core.

The manufacturer can use a structured core prepared from any number of materials. In at least one implementation the structured core can be prepared from a metallic material such as aluminum foam. In alternative implementations the structured core can comprise glass, stone, wood, ceramics, metals, polymers, or other materials.

In one or more implementations, particularly those that use heat and pressure to form the panels, the structured core can withstand temperatures and pressures greater the glass transition temperature and/or heat distortion temperature of the resin material. For example, the structured core can comprise metal or wood. Alternatively, the structured core can comprise a resin material comprising a relatively high glass transition temperature, while the resin material comprising the matrix on the other hand can have a relatively low glass transition temperature. For instance, the structured core can comprise a glass, polycarbonate, and/or composites or mixtures thereof, while the resin material comprises a co-polyester material, acrylic material, and/or composites or mixtures thereof.

The difference in melt or glass transition temperatures between the resin material and the structured core can allow a manufacturer to heat and press the resin materials into the cells of the structured core without melting or otherwise compromising the structure or strength of the structured core. Upon cooling, portions of the resin material within the structured core can form a mechanical bond unifying the resin material and the structured core. In one or more implementations, in addition to the mechanical bond, a chemical bond can form between the resin material and the structured core.

In any event, the bond between the resin material and the structured core can be stronger than chemical bonds formed by adhesives. Furthermore, in some implementations, the strength of the bond is independent of uniformity or a lack of bubbles, voids, and debris. Thus, implementations of the present invention can allow for repeated formation of structurally sound panels without the risk of panels with a defective bond.

Implementations of the present invention can thus produce strong and aesthetically pleasing resin panels having embedded structured-cores. In addition to excellent structural properties, embedded structured-core resin panels of the present invention can also provide unique and desirable aesthetics. For example, implementations of resin panels having embedded structured-cores can be translucent and allow light transmission there through. Designers can use such translucent resin panels having embedded structured-cores in lighting applications, such as light boxes, or as window coverings. Furthermore, the structured core and/or colors of the panels can provide varying degrees transparency/translucency, and thus, varying degrees of privacy. Thus, designers can use resin panels having embedded structured-cores of the present invention as partitions, doors, or dividers where varying degrees of privacy are desired. In still further implementations, a designer can implement resin panels having embedded structured-cores as counters, table-tops, or other structures.

Accordingly, and as will be appreciated more fully from the following specification and claims, a resin panel having an embedded structured-core in accordance with an implementation of the present invention can have aesthetic and functional versatility, and function in a wide variety of installations. In particular, designers can use the resin panels having embedded structured-cores described herein in any number of ceiling, floor, or wall applications, whether in indoor or outdoor environments, including any residential, commercial, or industrial environments. For example, resin panels having embedded structured-cores described herein can serve a primarily functional or structural use as a building component. In addition, the resin panels having embedded structured-cores described herein can function primarily for aesthetic/decorative use, such as to apply a particular look, and/or texture to a wall, column, or lighting element/arrangement in an interior or exterior space.

Figure 1B:
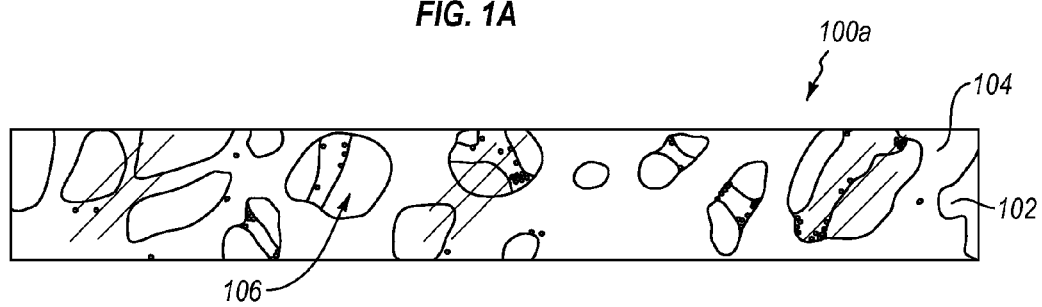
FIG. 1B is an end view of the panel of FIG. 1A.

Referring now to the Figures, FIGS. 1A and 1B illustrate a top view and an end view, respectively, of a resin panel having an embedded structured-core 100*a*. The resin panel 100*a* comprises a structured core 104 embedded in a resin material 102. The resin material 102 can be transparent or translucent to allow one to see the embedded structured-core suspended in the resin material.

As used herein, the terms "resin," "resin material," or "resin-based material" means a curable polymer material or any one of the following thermoplastic polymers (or alloys thereof). Specifically, such materials include but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like. The term "resin substrate" means a substrate comprising materials of one or more layers or sheets formed from any one of the above thermoplastic materials. Furthermore, the resin materials can include other thermoplastic polymers or thermoplastic polymer blends, or combinations and mixtures thereof. In addition, any given resin substrate or sheet can include one or more resin-based substrates and any number other layers or coatings.

For example, in one or more implementations, a resin panel having an embedded structured-core comprises a transparent, colorless resin material, as shown in FIGS. 1A and 1B. One will appreciate, however, that the resin panel having an embedded structured-core can alternatively comprise a colored or textured resin material of the same or different materials as those described above. The resin panel having an embedded structured-core can vary in thickness to include a range from relatively thin gauge panels to thicker gauge panels (e.g., greater than about one-sixteenth inch (1/16") to about 5 inches (5")). For example, in one or more implementations, the thickness of the resin panel having an embedded structured-core 100*a* can be anywhere from about one-sixteenth inch (1/16") to about two inches (2"). The thickness of the resin panel having an embedded structured-core 100*a* can be based at least partially on the amount of thermoplastic resin material 102 it comprises or the number of resin substrates used to form the panel, as well as the desired end-use.

In any event, in one or more implementations, the resin material 102 can include thermoplastic materials that a manufacturer can heat sufficiently above their glass transition temperature to soften, and then subsequently cool to solid form. More specifically, the resin material 102 can have a glass transition temperature lower than the melt or glass transition temperature of the structured core 104. One will appreciate that a metallic structured core 104 can withstand higher temperatures than a polymer-based structured core 104, and therefore allow for thermoplastic resin materials with higher glass transition temperatures.

Thus, one will appreciate that a manufacturer can select the thermoplastic materials of the resin material 102 based upon the materials of the structured core 104, or vice versa. As explained in greater detail below, the differences in melt or glass transition temperatures between the resin material 102 and the structured core 104 can allow a manufacturer to soften and press the resin material 102 into cells 106 of the structured core 104 without melting or otherwise compromising the structure or strength of the structured core 104.

In other implementations the resin material 102 can include curable, or casting, resins such as acrylic. An exemplary casting resin is ASTROCURE 1600G, made by ZIRCON, although other resins may be suitable for use within the context of the present invention. These materials can flow into cells 106 of the structured core 104 in a liquid form at room temperature. Therefore, curable resins can allow the use of structured cores 104 with lower melt or glass transition temperatures without risk of melting or deforming the structured cores 104.

As used herein, the term "structured core" means a structure including a plurality of cells or hollow chambers. For example, the structured core 104 of FIGS. 1A and 1B includes a plurality of randomly-shaped cells 106. In alternative implementations, the structured core 104 can comprise honeycomb cells or cells of virtually any other shape or size. For instance, the structured core 104 can include cells having a tubular, diamond, square, circular, or virtually any other shape.

No matter the configuration, the structured core 104 of the present invention can include cells or hollow chambers into which a resin material 102 can flow into and fill. For example, in one or more implementations, the structured core 104 can comprise aluminum foam. A manufacturer can form the cells 106 of such aluminum foam by bubbling air through molten aluminum to create randomly shaped voids. The manufacturer can use any type of aluminum foam, for example, large-cell, small-cell, open-cell, or closed-cell. Cells 106 extend only partially through the core by being closed on one or both sides, making the aluminum foam opaque. Alternatively, cells 106 can extend through the core (in direct or indirect paths) so as to be open on both sides, making the aluminum foam semi-transparent so that light can pass through.

Cells 106 of an aluminum foam core can vary widely in size and shape, creating a random, disordered appearance in a resin panel having an embedded structured-core 100. In alternative implementations with alternative structured cores 104, however, the manufacturer can use a structured core 104 with cells 106 of more uniform shape and size, creating a more ordered appearance. One will appreciate that the structured cores 104 themselves can be varied for a wide range of functional and/or aesthetic effects. For example, the structured cores 104 can be varied in terms of size, pattern, cell geometry, spacing, depth, thickness, color, material, and translucence.

In one or more implementations, the structured core 104 can comprise a wide variety of materials so long as the structured core 104 has a higher melt or glass transition temperature than that of the resin material 102. As mentioned previously, in one or more implementations, the higher melt or glass transition temperature of the structured core 104 can ensure that a manufacturer can soften or melt a thermoplastic resin material 102 sufficiently to press it into the structured core 104, without softening (at least not in a damaging way) the structured core 104.

In any case, in at least one implementation, the resin material 102 and/or the structured core 104 (or both) can be substantially translucent or transparent. Indeed in one or more implementations, the structured core 104 can be open-celled aluminum foam or a translucent thermoplastic polymer material, such that a significant amount of light can pass through the resin panel having an embedded structured-core 100. A manufacturer can use such translucent resin panels in lighting applications or as a semi-private divider. In alternative implementations, the resin material 102 and/or the structured core 104 (or both) can comprise opaque materials.

Figure 2A:
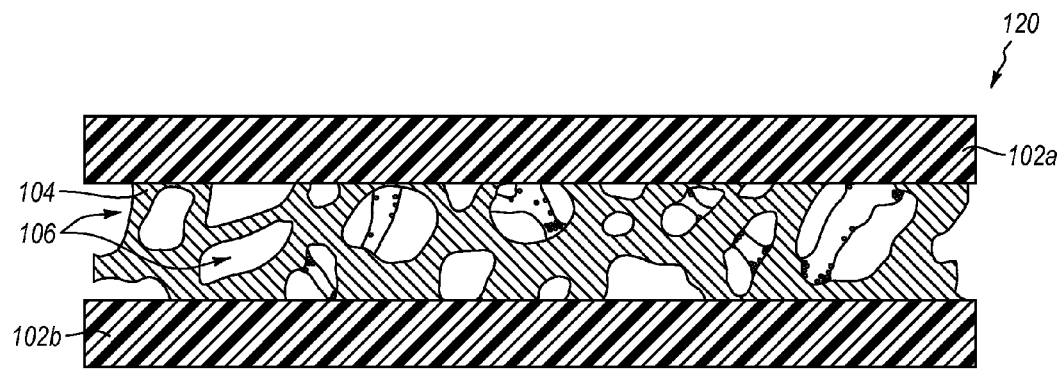
FIG. 2A illustrates a cross-sectional view of a panel layup-assembly for forming a resin panel with an embedded structured-core in accordance with one or more implementations of the present invention.
Figure 2B:
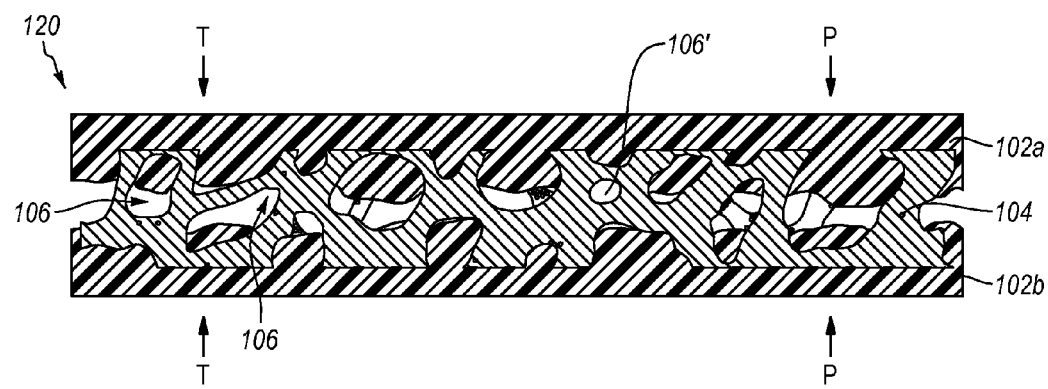
FIG. 2B illustrates a cross-sectional view of the panel layup-assembly of FIG. 2A under the application of heat and pressure after the resin substrates have begun to flow into and fill the cells of the structured core in accordance with one or more implementations of the present invention.
Figure 2C:
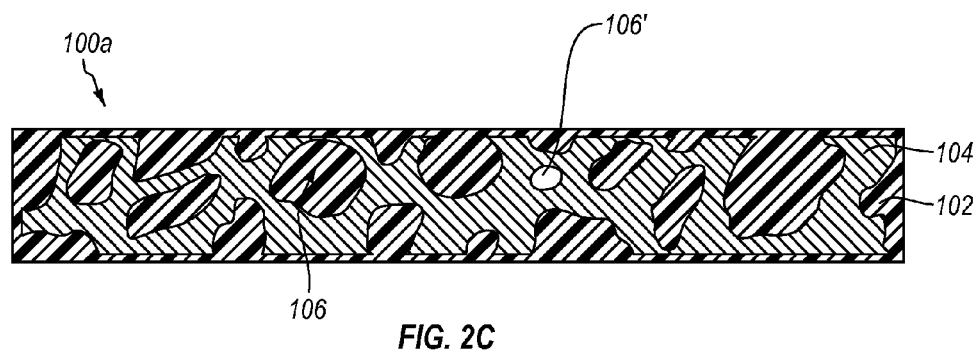
FIG. 2C illustrates a cross-sectional view of a finished panel after the resin substrates have merged at the center of the structured core in accordance with one or more implementations of the present invention.

FIGS. 2A-2C illustrate a schematic of a method for creating a resin panel having an embedded structured-core 100a from a layup assembly 120 using thermoplastic resin substrates 102a, 102b. In particular, FIGS. 2A-2C illustrate a sequential overview in accordance with an implementation of the present invention for creating a resin panel having an embedded structured-core 100a. For example, FIG. 2A illustrates that a layup assembly 120 in accordance with an implementation of the present invention can include opposing resin substrates or sheets 102a, 102b. The resin substrates 102a, 102b can be formed from any of the thermoplastic materials described herein above in defining "resin material," and can be translucent or transparent. Additionally, the resin substrates 102a, 102b can comprise a laminate of multiple layers of the same or different compatible materials.

Furthermore, the thermoplastic resin substrates 102a, 102b can have any appropriate thickness or amounts for the resulting thickness of a final resin panel, such as about two inches (2"), about one inch (1"), about one-half inch (½"), about one-fourth inch (¼"), about one-eighth inch (⅛"), about one-sixteenth inch (1/16"), or about one-thirty-second inch (1/32") in thickness or gauge as desired. In one or more implementations, the opposing resin substrates 102a, 102b can have similar thicknesses as shown in FIG. 2A. In alternative implementations, the thicknesses of the resin substrates 102a, 102b may differ. In any case, preferably the total thickness of the resin substrates 102a, 102b together is at least about as thick as the structured core 104. Thus the resin substrates 102a, 102b can flow all the way through the cells 106 of the structured core 104 and merge at the center of the structured core 104.

Additionally, the size (i.e., surface area) of the resin substrates 102a, 102b can also be any appropriate size for the desired size of the resulting resin panel. In at least one implementation, for example, the resin substrates 102a, 102b can be about four feet by about eight feet (4'×8'), about four feet by about ten feet (4'×10'), about six feet by about fifteen feet (6'×15'), or taller/wider. Or alternatively, the resin substrates 102a, 102b can be about six inches by about six inches (6"×6") or shorter/skinnier. Thus, a manufacturer can tailor the thickness and size of the resin substrates 102a, 102b depending upon the desired dimensions of a resulting resin panel.

The structured core 104 can have any size relative to the size (i.e., surface area) of the resin substrates 102a, 102b. For example, FIG. 2A illustrates that the structured core 104 can have approximately the same size (i.e., surface area) as the resin substrates 102a, 102b against which the structured core 104 is abutted. Alternatively, the resin substrates 102a, 102b can extend beyond the edges of the structured core 104 or vice versa. In still further implementations, the panel layup assembly 120 can include multiple structured cores 104 positioned between a pair of opposing resin sheets 102a, 102b.

FIG. 2A also depicts that the layup assembly 120 can include one or more structured cores 104 placed next to, or against, one or more resin substrates 102a, 102b. As shown in FIG. 2A, a manufacturer can abut the structured core 104 directly against the resin substrates 102a, 102b without any intervening adhesive liquids, films or other layers. This can ensure that resin material of the resin substrates 102a, 102b can flow into cells 106 of the structured core 104 and merge at the center of the structured core 104.

Further, one will appreciate that the manufacturer can construct the panel layup assembly 120 with a wide range of materials, which provide suitable properties in accordance with implementations described herein. In one implementation, for example, the manufacturer can use a structured core 104 comprised of aluminum foam, and use resin substrates 102a, 102b comprising glass transition temperatures that are lower than the melt temperature of aluminum. In alternative implementations, the manufacturer can use a structured core 104 comprised of a thermoplastic material such as polycarbonate, but use resin substrates 102a, 102b comprising glass transition temperatures that are lower than that of polycarbonate. Such lower glass transition temperature materials used in resin substrates 102a, 102b can comprise any number of thermoplastic sheet materials including co-polyesters, acrylic materials, and/or mixtures thereof.

In addition to the foregoing, the manufacturer may apply other components to the layup assembly 120 as may be required for applying temperature and pressure. In one implementation using conventional heat presses (thereby utilizing mechanical pressure and conductive heating and cooling), for example, the manufacturer can surround the layup assembly 120 with one or more pressure pads, one or more metal plates, and/or one or more texture papers (to impart still further aesthetic effects). The pressure pads and/or metal plates can equalize pressure and temperature across the entire surface of the layup assembly 120. By contrast, the texture papers can impart any number of different textures or glosses on the resin substrates 102a, 102b.

Upon preparing the layup assembly 120 as shown in FIG. 2A, the manufacturer can then apply heat and pressure to form a resin panel having an embedded structured-core 100a. In at least one implementation, the manufacturer uses enough heat and pressure to cause the one or more thermoplastic resin substrates 102a, 102b to melt and flow into the structured core 104, without causing the structured core 104 to melt, break, or deform. Furthermore, the temperature T and pressure P can be sufficient to cause the resin substrates 102a, 102b to flow through one or more cells 106 in the structured core 104, thereby filling all or nearly all of the space inside the one or more cells 106. Still further, the temperature T and pressure P can be sufficient to cause the resin substrates 102a, 102b to merge or fuse together at the center of the structured core 104.

In particular, in one or more implementations, the manufacturer can heat the layup assembly 120 to a processing temperature T sufficient to soften or at least partially melt the resin substrates 102a, 102b, but not high enough to soften or melt the structured core 104. Thus, the manufacturer can heat the panel assembly to a processing temperature T at least as great as the glass transition temperature of the thermoplastic resin substrate(s) 102a, 102b, but below the melt or glass transition temperature of the structured core 104. Along related lines, the manufacturer can apply a processing pressure P to the layup assembly 120 sufficient to cause softened or melted resin of the resin substrates 102a, 102b to flow into the cells 106 of the structured core 104, but not so great as to damage the structured core 104.

In at least one implementation, the processing temperature is between about 180° F. and about 295° F. One will appreciate that varying resins can have a wide range of glass transition temperatures, and thus, the processing temperature can vary depending on which resins are used. For example, in an implementation using an aluminum foam structured core 104 and co-polyester (e.g., PETG, PET, and PCTG) resin substrates 102a, 102b, the appropriate processing temperature T may be between about 180° F. to about 275° F. Alternatively, when using aluminum foam structured core 104 and acrylic (e.g., PMMA) resin substrates 102a, 102b, the appropriate processing temperature T may be between about 190° F. to about 295° F., depending largely on the applied pressure P. For example, in at least one implementation, the manufacturer can implement a processing pressure P that is between approximately 5 pounds per square inch (psi) and approximately 250 psi, and preferably between about 5 psi and about 90 psi for each such material. In an implementation in which the structured core 104 comprises aluminum foam and the opposing resin substrate(s) 102a, 102b comprise a co-polyester material, the appropriate pressure can be about 40 psi.

As discussed herein, the structured core 104, in one or more implementations, does not deform in any appreciable way since the above-mentioned temperatures do not elevate the materials of the structured core 104 to its melt or glass transition temperature (i.e., aluminum has a melt temperature above 1200° F., and polycarbonate has a glass transition temperature that is usually achieved at temperatures higher than 285° F.). Similarly, the noted temperatures and pressures of the present invention do not elevate the materials of the structured core 104 to heat distortion temperatures. The primary point in at least one implementation is that the structured core 104 will not be at its melt temperature, glass transition temperature, or heat distortion parameter(s), even if the adjacent resin substrate(s) 102a, 102b is at such parameters.

One will appreciate that a manufacturer can apply the processing temperature(s) T and pressure(s) P to the panel layup assembly 120 to form a resin panel having an embedded structured-core 100a in any number of different apparatus. For example, in one or more implementations the manufacturer can place the panel layup assembly 120 within a thermosetting press. In general, the thermosetting press can include upper and lower platens configured to provide direct heat and pressure to both opposing sides of the given layup assembly 120.

In addition to the foregoing, implementations of the present invention can further include using an autoclave to apply the processing temperatures T and pressures P. For example, the manufacturer can place the panel layup assembly 120 into a vacuum bag. The manufacturer can then seal the edges of the vacuum bag, and remove air from the vacuum bag. The manufacturer can then place the vacuum bag within the autoclave, which applies equal heat and pressure in all directions on the panel layup assembly 120. In general, an autoclave can heat the panel layup assembly 120 (e.g., via a convection process, rather than via conduction as with a mechanical press) with a controlled temperature profile.

One will appreciate that the autoclaving process can provide a number of additional benefits for creating an appropriate, aesthetically pleasing, resin panel having an embedded structured-core 100a. For example, autoclaving is typically not constrained to one size/format (i.e., an autoclave can process a 2'×4' piece at the same time as an 8'×10' piece). In addition, in the autoclaving process, pressure can be continuous throughout heating and cooling cycles. This continuous pressure can keep the panel layup assembly 120 flat throughout the heating and cooling cycles, which can eliminate bowing. In addition, this non-continuous pressure can enable resin substrates 102a to heat sufficiently under low pressures to flow around a structured core 100a that may be delicate or otherwise susceptible to breakage under high pressures. Then, once the resin substrates 102a have sufficiently encapsulated the core 100a, pressure can be increased to ensure sufficient bonding of the resin material of the resin substrates 102a.

Further along these lines, autoclaving is a convective heating process that allows for more controlled heating and cooling at each direction about the panel layup assembly 120, and thus allows for equal temperatures at the same depth throughout each corresponding substrate's thickness. Again, since the temperature, and pressure, is uniformly distributed throughout each substrate, the autoclave can process multiple different panel layup assemblies 120 without any warping/bowing, etc. Similarly, because an autoclave can apply pressure uniformly in any direction, autoclaves can provide for the production of curved panels by selectively orienting substrates around a pre-formed or pre-shaped core material.

In addition to an autoclave process, yet another implementation for heating and pressurizing a panel layup assembly 120 can include use of a vacuum press. In particular and as previously mentioned with respect to the autoclave process, a manufacturer can prepare a vacuum bag with a panel layup assembly 120 therein. The manufacturer can then position the vacuum bag into a vacuum press, and apply the appropriate processing temperatures and/or pressures. In another implementation, a manufacturer can place a panel layup assembly 120 (without a vacuum bag) in a vacuum press chamber, where air is evacuated prior to application of any mechanical pressure.

FIG. 2B illustrates the changes that the resin substrates 102a, 102b can undergo as the temperature of the resin substrates 102a, 102b reaches the processing temperature T (i.e., a temperature near or above the glass transition temperature of the resin substrates 102a, 102b). In particular, FIG. 2B illustrates that as the panel layup assembly 120 reaches the processing temperature T, the resin substrates 102a, 102b begin to soften and flow into cells 106 of the structured core 104. One will appreciate that the processing temperature T, pressure P, and the amount of time for applying such temperature and pressure will vary depending on the type of resin material 102 used. The primary point in at least one implementation is that the temperature, pressure, and time interval can be chosen to allow the resin substrates 102a, 102b to flow into and fill all the space or nearly all the space inside one or more cells 106 of the structured core 104.

FIG. 2B illustrates that once the resin materials of the resin substrates 102a, 102b have begun to melt, the pressure P causes resin to flow in and/or through the chambers/cells 106 of the structured core 104. Nevertheless, the resin substrates melt in or through the cells 106 without causing significant melting or deformation of the structured core 104. In particular, as the resin flows into the cells 106 of the structured core 104, it fills all, nearly all, or a majority of the space inside the cells 106. The resin substrates 102a, 102b then can further merge and fuse together at the center of the structured core 104 such that they can become a unitary resin material that is also mechanically interlocked with or mechanically bonded to the structured core 104 throughout the structured core 104. As a result, one will appreciate that the bond between the structured core 104 and resin substrates 102a, 102b is much stronger than conventional adhesive-based laminates.

In one or more implementations, one or more of the cells 106 can comprise a closed cell. For example, FIG. 2B illustrates that the structure core 104 includes a closed cell 106'. A closed cell can comprise a cell that that is closed off on all sides from other cells or the edges of the structured core. In such instances, the resin material of the resin substrates 102a, 102b may not flow into the closed cell 106'. One will appreciate that a particular structured core can include one or more closed cells 106'. Alternatively, a given structured core or may be devoid of closed cells 106'.

FIG. 2C further illustrates that the final result of the process (i.e., after thermoplastic resin substrates 102a, 102b have cooled below their respective glass transition temperatures) includes a resin panel 100a including structured core 104 embedded in a unitary resin material 102. In particular, FIG. 2C illustrates that resin material 102 can occupy the space inside the cells/chambers 106 throughout the structured core 104. One will appreciate that by filling the cells/chambers 106 of the structured core 104 the surface area of the bond between the resin material 102 and the structured core 104 is increased, thereby increasing the strength of the assembly.

As shown by FIG. 2C, the structured core can include cells 106 positioned at an outer edge of the structured core 104 and cells 106 positioned within the structured core (i.e., cells not exposed at an outer edge of the structured core 104). Some of the cells positioned within the structured core 104 are positioned in the center of the structured core 104, or in other words approximately positioned at equal distances from opposing outer edges of the structured core 104. The resin material 102 can occupies at least a majority of the space inside the cells 106 positioned within the structured core 104. Additionally, the resin material 102 can occupy at least a majority of the space inside the cells 106 positioned at the outer edge of the structured core 104.

As previously mentioned, manufacturers can modify implementations of the present invention in any number of ways to achieve a wide range of functional and/or aesthetic effects. In at least one implementation of the present invention, for example, the resin panel having an embedded structured-core 100a comprises one or more at least partly translucent resin substrates. The resin substrates can further comprise coloration in one form or another, such as by further including any dyes during the resin extrusion process, or by laminating still further colored films directly to the substrates (before, during, or after pressing the substrates into the structured core).

Figure 3A:
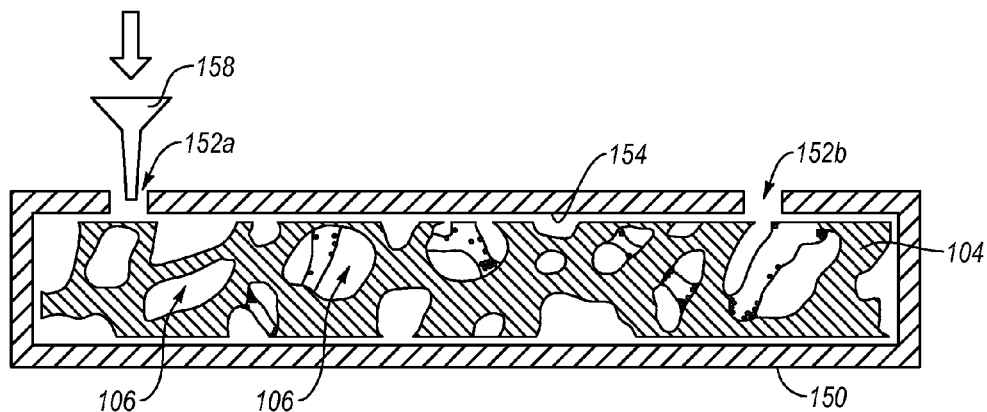
FIG. 3A illustrates a cross-sectional view of a structured core inside a form in accordance with one or more implementations of the present invention.
Figure 3B:
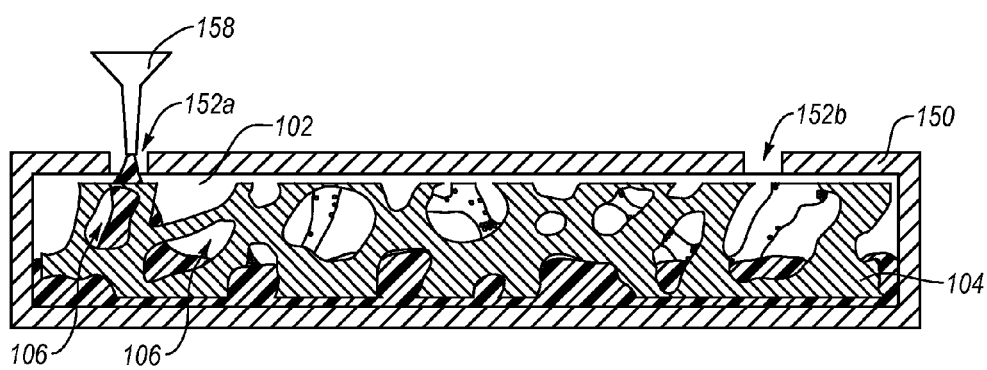
FIG. 3B illustrates a cross-sectional view of the structured core and form of FIG. 3A after a liquid thermoset resin material has begun to flow into and fill the cells of the structured core in accordance with one or more implementations of the present invention.
Figure 3C:
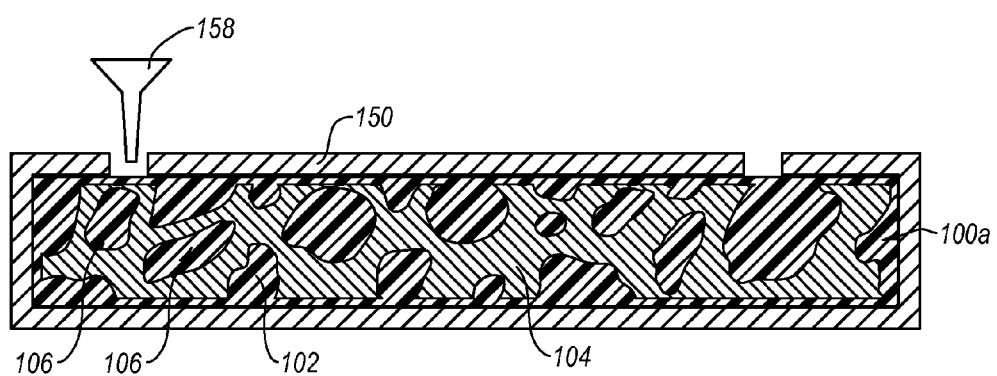
FIG. 3C illustrates a cross-sectional view of a finished panel inside a form after the liquid thermoset resin has solidified in accordance with one or more implementations of the present invention.

FIGS. 3A-3C illustrate a schematic of a method for creating a resin panel having an embedded structured-core 100a using a form and a liquid resin material. In particular, FIGS. 3A-3C illustrate a sequential overview in accordance with an implementation of the present invention for creating a resin panel having an embedded structured-core 100a. For example, FIG. 3A illustrates a structured core 104 placed within interior surfaces 154 of a form 150. The form 150 can be any size and shape appropriate for the size and shape of the resulting resin panel, such that the structured core 104 can be placed within the interior surfaces 154 of the form 150. Also, in one or more implementations, the form 150 can have one or more openings 152a, 152b through which the manufacturer can pour resin or remove air.

The manufacturer can use a structured core 104 comprising any of the characteristics previously discussed. In one or more implementations, the structured core 104 comprises aluminum foam. In alternative implementations, however, the structured core 104 can vary in material, size, thickness, shape, color, translucency, cell configuration, and other characteristics as previously discussed.

As shown in FIG. 3A, a form 150 can be roughly the same size (i.e., surface area) as or slightly larger than a structured core 104 so that the structured core 104 fits into the interior of the form 150. In one or more alternative implementations, however, the form 150 can be larger than the structured core 104. For example, depending on the size of the structured core 104 and the desired size of the resulting resin panel, the form 150 can be any of the sizes given hereinabove in describing resin substrates.

The thickness of the form 150 can also vary depending on the thickness of the structured core 104 and the desired thickness of the resulting resin panel. In particular, the thickness of the form 150 can be roughly equal to or thicker than the thickness of the structured core 104. For example, the form 150 can be any of the thicknesses given hereinabove in describing resin substrates. Thus, a manufacturer can tailor both the thickness and size of the form 150 depending upon the desired dimensions of the resulting resin panel having an embedded structured-core 100.

In addition to the foregoing, a form 150 can be shaped similarly to the structured core 104 or be shaped differently. In particular, a manufacturer can choose different shapes for the form 150 depending on the shape of the structured core 104 and the desired shape of the resulting resin panel. For example, in one or more implementations the form 150 can be similar in shape to the structured core 104 so as to create a resin panel having an embedded structured-core 100a of similar shape to the structured core 104. In alternative implementations, the form 150 can be shaped differently than the structured core. If desired, a manufacturer can use a form 150 of a different shape than the structured core 104, but then use an appropriate cutting tool to trim off resin material around the edges of the structured core to create a resin panel shaped similarly to the structured core.

A form 150 can enclose the structured core 104 on all sides, or it can be open on one side. In particular, a manufacturer can choose whether to use a form 150 that surrounds the structured core 104 on all faces of the structured core 104, or a form 150 that is open on one face. For example, in one or more implementations the form 150 is completely closed except for the above-mentioned openings 152a, 152b for pouring resin or removing air. In such implementations all the faces of the resulting resin panel having an embedded structured-core 100a are formed where resin material abuts a corresponding interior face 154 of the form. In at least one other implementation, however, the top face of the form 150 can be open. In this case, the top face of the resulting resin panel having an embedded structured-core 100a is formed at the interface between the resin material and the air or space above the form 150, after the resin material has settled into the form 150.

Interior faces 154 of the form 150 can be in any number of different configurations. In particular, the manufacturer can choose configurations of the interior faces 154 in order to affect the shape, appearance, or other qualities of the finished resin panel. In one or more implementations, the interior surfaces 154 can be smooth and flat to produce smooth, flat faces on the resulting resin panel. In alternative implementations, the interior faces 154 can comprise any number of different shapes, patterns, or textures, which can then transfer to the surfaces of the resulting resin panel.

For example, in one or more implementations, the interior surfaces 154 can have a curved shape so as to produce a convex or concave resin panel. Also, the interior surfaces 154 can have raised or depressed decorative patterns, textures, images, or shapes. Edges of the interior surfaces 154 can be beveled, rounded, or otherwise designed to affect the edge of the resulting resin panel having an embedded structured-core.

FIG. 3B illustrates pouring resin into the form 150 through one or more openings 152a, 152b in the form 150, in accordance with an implementation of the present invention. In particular, a manufacturer can pour a liquid resin material 102 into the form 150. The resin material can flow into and fill cells 106 of a structured core 104 inside the form 150. In one or more implementations, the manufacturer can use a curable, casting liquid resin material such as acrylic. Similarly a manufacturer can use thermoset resins, such as epoxies. In alternative implementations, the manufacturer can use molten thermoplastic resin materials that are capable of being poured.

As seen in FIG. 3B, in one or more implementations, the manufacturer can pour a liquid resin material into the form 150 through an opening 152a with a funnel 158. In alternative implementations, the manufacturer can use any method of pouring or injecting liquid resin material into the form. During the pouring process the form 150 can have any orientation, such as substantially horizontal, substantially vertical, or on any incline between horizontal and vertical. Furthermore, the manufacturer can change the orientation during pouring to help the resin material 102 flow into the cells 106.

In addition to the foregoing, in one or more implementations, the manufacturer can remove air from the form 150 before pouring the liquid resin material. For example, a vacuum pump can remove air through an opening 152a, 152b before pouring. In alternative implementations, a manufacturer can remove air through a first opening 152b while simultaneously pouring resin material 102 through a second opening 152a. The manufacturer can remove air using a pump, a syringe, or other tools. In yet other alternative implementations, however, the liquid resin material 102 can force air of the form 150, either through the same opening 152a through which the liquid resin is poured or through a second opening 152b.

One will appreciate that if the manufacturer does not remove the air from the form 150, air bubbles may remain in the resulting resin panel. In one or more implementations, the manufacturer can pierce the air bubbles with a syringe needle and remove them, causing the liquid resin to fill the remaining space. In such implementations the manufacturer can insert the syringe through an opening 152b in the form 150, or through the wall of the form 150. In alternative implementations, the manufacturer can rotate or shake the form 150 to drive air bubbles to the surface or near an opening 152a, 152b where they can be removed.

In one or more implementations of the present invention, the manufacturer can use a curable resin such as acrylic. The manufacturer can use a resin that is curable by the application of UV light, heat, or by other means. In one or more alternative implementations, the manufacturer can use a melted thermoplastic resin material of any of the types mentioned above in defining "resin substrates."

As previously discussed, the structured core 104 can comprise materials having a higher melt or glass transition temperature than the melt or glass transition temperature of the resin material used. Therefore, a manufacturer using melted resin can avoid deforming the structured core 104 by using a structured core 104 having a glass transition temperature higher than the melt temperature of the melted resin. For example, an aluminum foam core can resist deformation at the melt temperatures of many thermoplastic materials. One will appreciate, however, that using casting resin can allow the manufacturer to use structured cores 104 made of materials with lower melt or glass transition temperatures. For example, when using a casting resin, the structure core 104 can comprise co-polyester or other resin material having a relatively low glass transition temperature.

FIG. 3C illustrates a completed resin panel having an embedded structured-core 100a after the resin material 102 has hardened or solidified within the form 150. In one or more implementations, the manufacturer can wait an appropriate amount of time for the resin material 102 to harden and then remove the resin panel 100a from the form 150. In one implementation, for example, an appropriate time to wait for ASTROCURE 1600G to cure is about 12 hours to about 24 hours. In alternative implementations the manufacturer can apply a sufficient amount of UV light, heat, or other means as required by particular curable resins. In still other alternative implementations where the manufacturer uses a melted resin, the manufacturer can wait for an appropriate amount of time for the melted thermoplastic resin to cool below its respective glass transition temperature.

In any event, as seen by FIG. 3C, resin material 102 can fill at least a majority of the cells 106 of the structured core 104 in the resin panel 100a. Indeed, in one or more implementations resin material can fill all of the cells 106 of the structured core 104 in the finished product. In alternative implementations, a manufacturer can leave one or more cells 106 devoid of resin material 102 to provide a desired aesthetic.

FIGS. 3C and 2C also illustrate that resin material 102 can completely surround the structured core 104. In other words, resin material 102 can cover the sides and other surfaces of the structured core 104 such that the structured core 104 is completely embedded in the resin material 102. In alternative implementations, at least a portion of the structured core 104 is exposed and free from resin material 102.

As previously mentioned, manufacturers can modify implementations of the present invention in any number of ways to achieve a wide range of functional and/or aesthetic effects. For example, one will appreciate that the structured cores 104 themselves can comprise a wide range of functional and/or aesthetic effects. For example, the structured cores can be varied in terms of size, pattern, cell geometry, spacing, depth, thickness, color, material, and translucence.

Figure 4A:
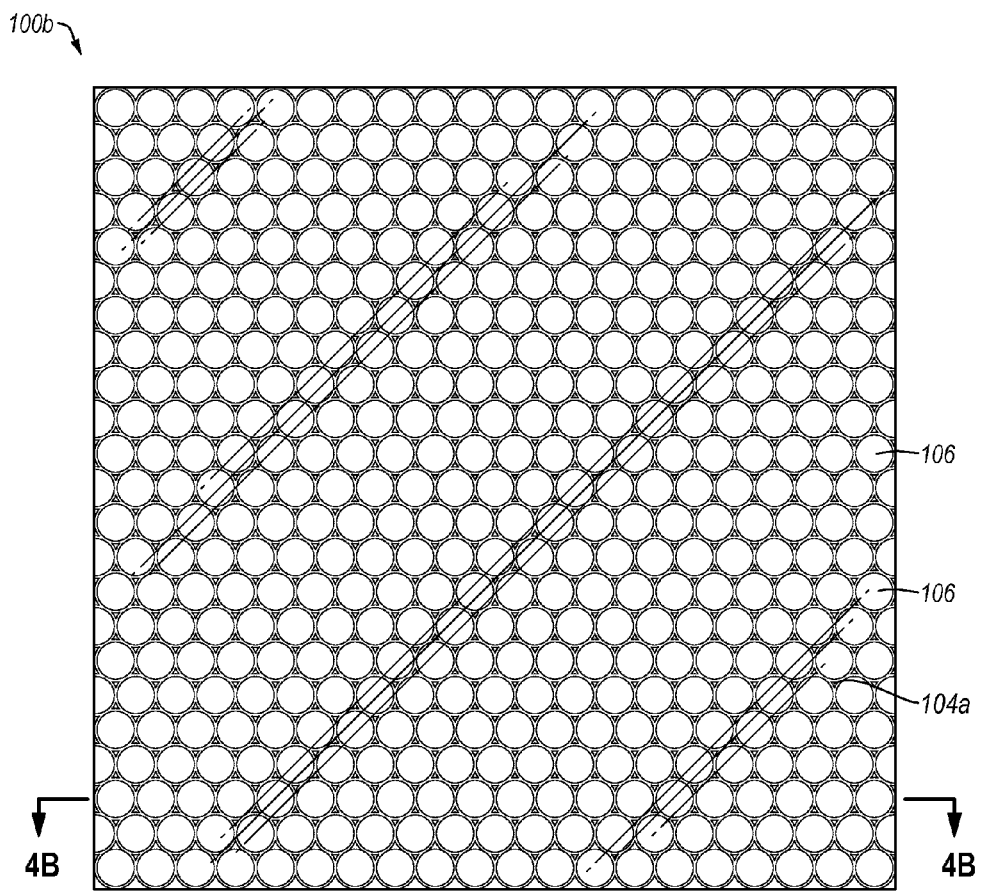
FIG. 4A illustrates a facing view of another resin panel having an embedded structured-core in accordance with one or more implementations of the present invention.
Figure 4B:
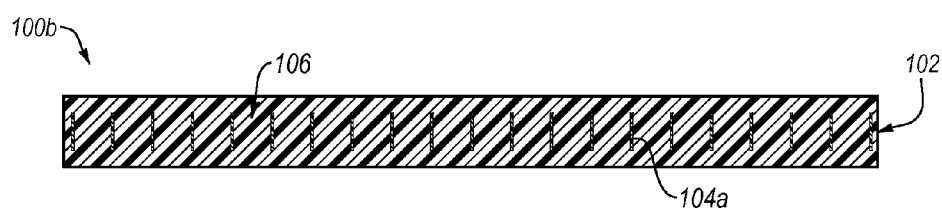
FIG. 4B is a cross-sectional view of the resin panel of FIG. 4A taken along the line 4B-4B in accordance with one or more implementations of the present invention.

For example, FIGS. 4A and 4B illustrate views of another resin panel having an embedded structured-core 100b in accordance with an implementation of the present invention. Specifically, FIG. 4A illustrates a top view of the resin panel 100b, while FIG. 4B illustrates a cross-sectional view of the resin panel 100b taken along the line 4B-4B of FIG. 4A. As shown by FIGS. 4A and 4B, the resin panel 100b can include a structured core 104a embedded in a resin material 102. More particularly, the structured core 104a can comprise a honeycomb structure with honeycomb cells 106.

As shown by FIGS. 4A and 4B, the cells 106 can extend completely through the structured core 104a in a linear fashion. Furthermore, resin material 102 can fill each of the cells 106. The cells 106 in the resin panel 100b comprise cylinders. In contrast to the structured core 104 shown in FIGS. 1A-3C, the structured core 104a can comprise a resin material instead of aluminum foam.

Figure 5A:
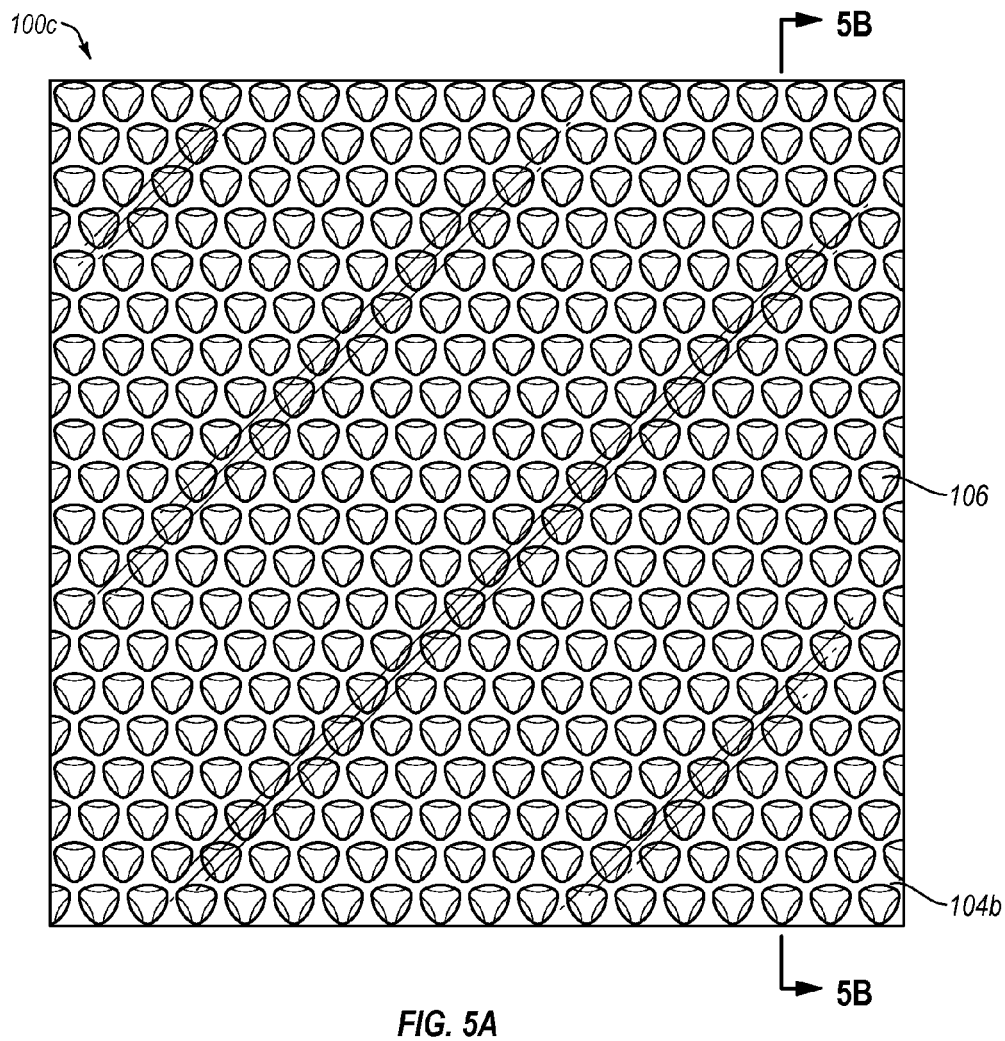
FIG. 5A illustrates a facing view of yet another resin panel having an embedded structured-core in accordance with one or more implementations of the present invention.
Figure 5B:
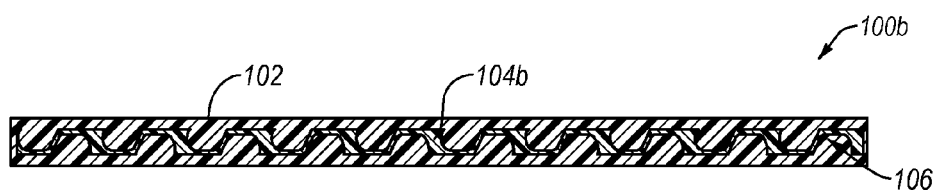
FIG. 5B is a cross-sectional view of the resin panel of FIG. 5A taken along the line 5B-5B in accordance with one or more implementations of the present invention.

FIGS. 5A and 5B illustrate views of yet another resin panel having an embedded structured-core 100c in accordance with an implementation of the present invention. Specifically, FIG. 5A illustrates a top view of the resin panel 100c, while FIG. 5B illustrates a cross-sectional view of the resin panel 100c taken along the line 5B-5B of FIG. 5A. As shown by FIGS. 5A and 5B, the resin panel 100c can include a structured core 104b embedded in a resin material 102. More particularly, the structured core 104b can comprise a honeycomb structure with honeycomb cells 106.

As shown by FIG. 5A, the resin material 102 can be translucent, and can allow a user to view the honeycomb cells 106 therethrough. As previously mentioned, the cells of the structured core can include any number of geometries depending upon a desired aesthetic. For example, FIG. 5A illustrates that of the cells 106 of the structured core 104b can have the shape of a Reuleaux triangle. One will appreciate that the Reuleaux triangle shape of the cells 106 can provide a unique and desirable aesthetic.

As shown by FIGS. 5A and 5B, the cells 106 can extend only partially through the structured core 104b. Furthermore, resin material 102 can fill each of the cells 106. In contrast to the structured core 104 shown in FIGS. 1A-3C, the structured core 104b can comprise a resin material instead of aluminum foam.

No matter the configuration of the structured core 104, 104a, 104b, or the method of manufacture, in one or more implementations resin material can harden into plugs that at least partially fill the cells 106, which can result in a mechanical interlock with the cells 106. Thus, the processes of the present invention can form a bond between the resin material 102 and the structured core 104, 104a, 104b that is sufficiently strong to avoid delamination even under extreme conditions. Such extreme conditions may include dynamic and static loads, wide fluctuations in temperature, peeling forces or forceful impacts. In view of such properties, one will appreciate that the resin panels 100, 100a, 100b made in accordance with the present invention can function in a wide range of applications, including as building components.

Figure 6:
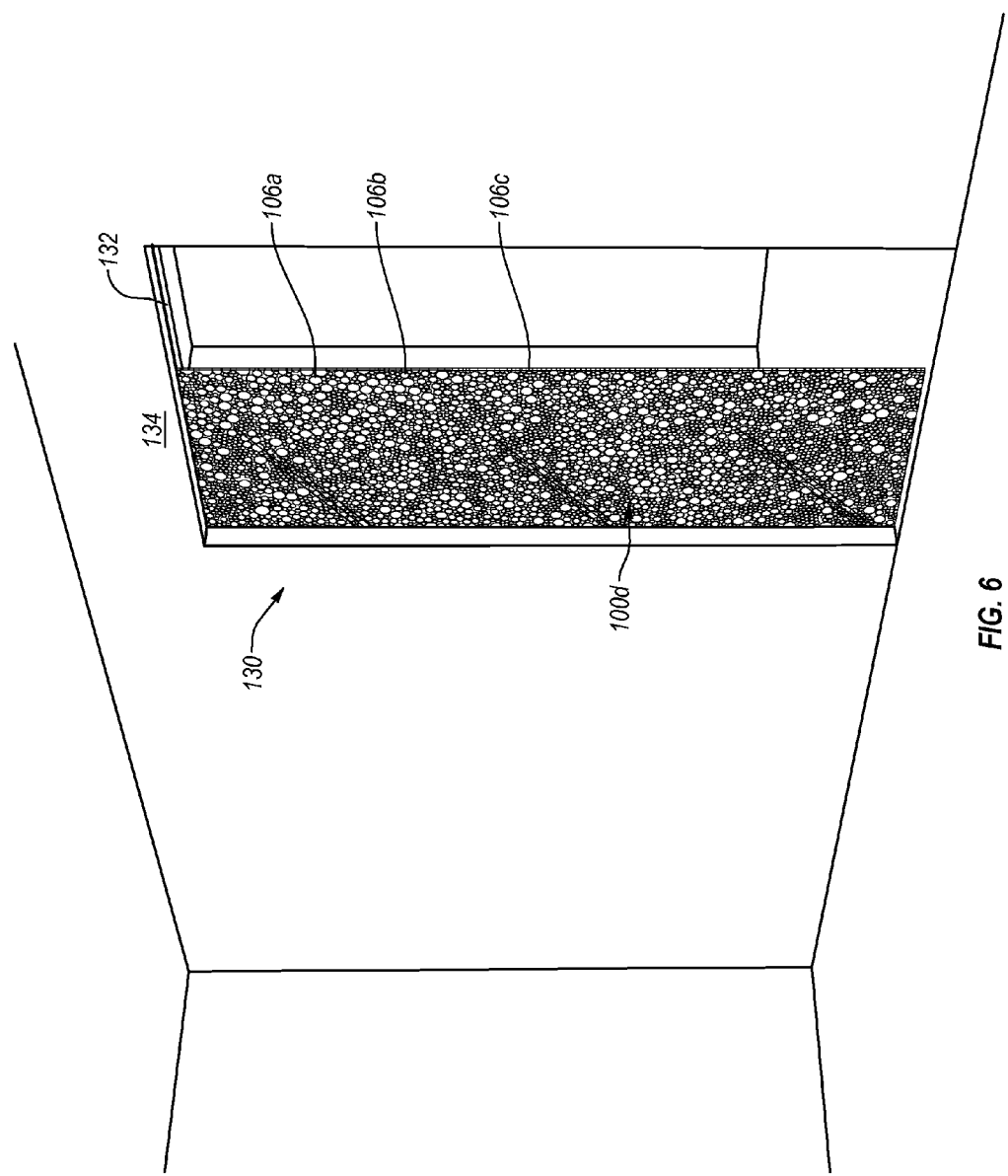
FIG. 6 is schematic view of panel system including a resin panel having an embedded structured-core secured to a support structure as a sliding door in accordance with one or more implementations of the present invention.

For example, FIG. 6 illustrates a panel system 130 including a resin panel with an embedded structured core 100d. More particularly, FIG. 6 illustrates a mounting system 132 (i.e., sliding door suspension tracks) securing a resin panel with an embedded structured core 100d to a support structure 134 as a sliding door. One will appreciate that the resin panel with an embedded structured core 100d may be particularly suited for use as a partition, such as a sliding door, because of its functional and aesthetic features.

Furthermore, one will appreciate that the cells of the resin panel with an embedded structured core 100d can provide a unique aesthetic. As mentioned previously, the cells of the structured core can have a wide variety of shapes and configurations. Additionally, the cells of a particular structured-core laminate panel need not be uniform. For example, FIG. 6 illustrates a structured core including cells with various different sizes (i.e., large sized cells 106b, medium sized cells 106c, and small sized cells 106d).

Figure 7:
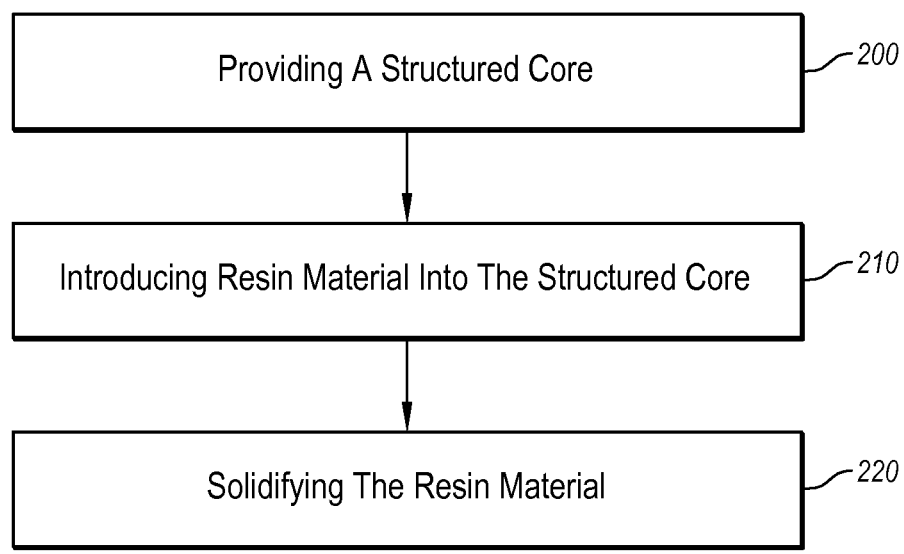
FIG. 7 illustrates a chart of acts and steps in a method of forming a resin panel having an embedded structured-core in accordance with one or more implementations of the present invention.

Accordingly, FIGS. 1A-6, the corresponding text, provide a number of different components and mechanisms for creating resin panel with an embedded structured core 100a-d in an efficient, aesthetically pleasing way. In addition to the foregoing, implementations of the present invention can also be described in terms of flowcharts comprising acts and steps in a method for accomplishing a particular result. For example, FIG. 7 illustrates a flowchart of one exemplary method for producing a resin panel 100a, 100b, 100c, 100d using principles of the present invention. The acts of FIG. 7 are described below with reference to the components and diagrams of FIGS. 1A through 6.

For example, FIG. 7 shows that a method of creating a structured-core resin panel 100a, 100b, 100c, 100d comprises an act 200 of providing a structured core 104, 104a, 104b. Act 200 can involve providing an aluminum foam structured core, a resin structured core, or a structured core comprising another material. In any event, the structured core 104, 104a, 104b can comprise a plurality of cells 106.

In addition, FIG. 7 shows that the method can comprise an act 210 of introducing resin material into the structured core. For example, act 210 can comprise introducing resin material 102 into the cells 106 of a structured core 104, 104a, 104b. The resin material 102 can fill at least a majority of the cells 106 of the structured core 104, 104a, 104b. Indeed, in one or more implementations, the resin material can completely fill at least one cell 106 positioned in the center of the structured core 104, 104a, 104b.

In one implementation, act 210 positioning one or more resin substrates 102a, 102b about a structured core 104, 104a, 104b. More specifically, act 210 includes creating a panel layup assembly 120. For example, act 210 can involve positioning one or more resin substrates having a first glass transition temperature about a structured core having a second melt or glass transition temperature greater than the first glass transition temperature. For instance, a manufacturer can position resin substrates 102a, 102b formed from co-polyester or acrylic material about a structured core 104, 104a, 104b formed from aluminum foam or a polycarbonate material. The manufacturer can then place the opposing resin substrates 102a, 102b directly against a structured core 104, 104a, 104b without any adhesive films or other layers between the resin substrates 102a, 102b and the structured core 104, 104a, 104b.

Act 210 can further involve heating the panel layup assembly 120 to a processing temperature T at least as great as the glass transition temperature of the outer resin substrates 102a, 102b but below the melt or glass transition temperature of the structured core 104, 104a, 104b. In other words, act 210 can comprise softening the first and second resin substrates 102a, 102b at a pressure P and temperature T such that the first and second resin substrates can flow into the cells 106. In connection with act 210, a portion of the one or more resin substrates flows into the structured core 104, 104a, 104b. For example, a manufacturer can heat the panel layup assembly 120 to a temperature of between about 180° F. and about 275° F., such as to a temperature of about 225° F. The manufacturer can heat the panel layup assembly 120 in a lamination press, autoclave, vacuum bag, or other thermosetting environment. In an autoclave, a manufacturer may further perform the lamination by inserting the materials of the above-described laminate assembly into a vacuum bag.

In connection with applying heat to the panel layup assembly 120, the manufacturer can apply a processing pressure P to the panel layup assembly 120. The processing pressure P can cause the softened or molten resin material 102 to flow into the cells 106 of the structured core 104, 104a, 104b. In one or more implementations, the processing pressure P can comprise a positive pressure applied via a lamination press. The positive pressure can force the resin material 102 into the cells 106 of the structured core 104, 104a, 104b.

In alternative implementations, the processing pressure P can comprise a negative pressure or vacuum. The negative pressure or vacuum can draw the resin material into the cells 106 of the structured core 104, 104a, 104b. A vacuum bag, vacuum press, or an autoclave can be utilized to apply the negative pressure or vacuum. In any event, resin material 102 can flow into at least one cell 106 of the structured core 104, 104a, 104b such that the resin material 102 occupies at least a majority of the space inside the at least one cell 106.

In an alternative implementation, act 210 can involve placing the structured core 104, 104a, 104b into a form 150. Act 210 can also involve pouring the resin material 102 into the form 150. For example, act 210 can involve pouring a casting resin, molten resin, or other resin material 102 capable of flowing into the form 150. The resin material can fill one or more cells 106 of the structured core 104, 104a, 104b.

FIG. 7 also shows that the method comprises act 220 of solidifying the resin material. Act 220 can include cooling the resin material below the first glass transition temperature. For example, a manufacturer can place the heated panel layup assembly 120 into a cold press or simply position can position the heated panel layup assembly 120 so that ambient air can cool the resin material 102 until its solidifies. Upon cooling, the resin material 102 within the structured core 104, 104a, 104b can harden and form an interlocking mechanical bond unifying the resin material 102 and the structured core 104, 104a, 104b. In one or more implementations, in addition to the mechanical bond, a chemical bond can form between the resin material 102 and the structured core 104, 104a, 104b. Additionally, or alternatively, act 220 can involve applying UV light or heat to cure a liquid resin material 102. In still further implementations, act 220 can involve polymerizing a resin material until it hardens.

Accordingly, the schematics and methods described herein provide a number of unique products, as well as ways for creating aesthetically pleasing, decorative, architecturally-suitable panels with embedded structured cores. As discussed herein, these panels can be substantially translucent or transparent in order to provide a desired aesthetic. Accordingly, implementations of the present invention can create not only a resin panel with an embedded structured-core with pleasing aesthetics, but also a panel that is sufficiently strong to avoid delamination and separation even under extreme conditions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A translucent resin panel with an embedded, displayed structured-core for use as a treatment to walls, ceilings, or as a partition, the panel comprising:
    a structured core having a plurality of cells extending through the core such that light can pass through the structured core and the structured core is at least semi-transparent; and
    a resin material surrounding the structured core and occupying space inside the cells of the structured core;
    wherein:
    the structured core is displayed through the resin material such that it is suspended in the resin material; and
    the resin material that occupies the space in cells also provides an outside surface of the resin panel;
    one or more cells of the structured core are filled with resin material;
    at least some but not all of the cells of the structured core are filled with resin material.

2. The panel as recited in claim 1, wherein the structured core further comprises metal foam.

3. The panel as recited in claim 2, wherein the structured core further comprises aluminum foam.

4. The panel as recited in claim 2, wherein the cells of the structured core have a random arrangement, wherein at least some of the plurality of cells provide a direct path of light from one side of the core to another, and at least some of the plurality of cells provide an indirect path of light from one side of the core to another.

5. The panel as recited in claim 1, wherein the structured core comprises the resin-based material within the structured core, such that the resin material is mechanically bonded to the structured core.

6. The panel as recited in claim 1, wherein the resin material is thermoset resin that has been cured.

7. The panel as recited in claim 1, wherein:
    the resin material comprises first and second polycarbonate sheets bonded on opposing sides of the structured core;
    each of the polycarbonate sheets has melted into the structured core without deformation of the structured core to mechanically bond to the structured core on one side; and
    each of the polycarbonate sheets provide an outside surface of the resin panel on an opposing side.

8. A method for creating a light transmitting resin panel that displays an embedded structured-core for use as a treatment to walls, ceilings, or as a partition, the method comprising:
    providing a structured core having a plurality of cells, the plurality of cells comprising one or more cells positioned at an outer edge of the structured core and one or more cells positioned within the structured core, wherein at least some of the plurality of cells provide a path for light to be transmitted from one side to the other, such that the structured core is at least semi-transparent;
    providing a resin material;
    introducing the resin material into the one or more cells positioned within the structured core such that the resin material occupies at least a majority of the space inside the one or more cells positioned within the structured core;

surrounding the structured core with the resin material, wherein the resin material is mechanically bonded within the plurality of cells and also provides an outside surface of the structured core; and allowing the resin material to harden to form a unitary panel.

9. The method as recited in claim 8, wherein introducing the resin material into at least one cell of the structured core comprises pressing a first resin substrate and a second resin substrate about the structured core.

10. The method as recited in claim 9, further comprising softening the first and second resin substrates at a pressure and temperature such that the first and second resin substrates can flow into the cells.

11. The method as recited in claim 10, further comprising applying heat and pressure until resin of the first resin substrate and resin of the second resin substrate meet within the structured core.

12. The method as recited in claim 8, wherein introducing the resin material into at least one cell of the structured core comprises:

placing the structured core into a form; and pouring the resin material into the form.

13. The method as recited in claim 12, further comprising removing air from the form before pouring the resin material into the form.

14. The method as recited in claim 8, wherein the structured core comprises metal.

15. The method as recited in claim 14, wherein the structured core comprises aluminum foam.

16. A panel system, comprising:

one or more translucent resin panels, comprising:

an at least semi-transparent structured core comprising a plurality of cells, the plurality of cells comprising one or more cells positioned in the center of the structured core;

resin material that surrounds the structured core to provide a transparent outside surface to the structured core, and the resin material at least partially filling the one or more cells positioned at the center of the structured core to thereby mechanically bond the resin outside surface to the plurality of cells of the structured core; and a mounting system that secures the one or more translucent resin panels to a support structure, wherein:

the structured core is displayed through the one or more translucent resin panels; and the structured core comprises polycarbonate, glass or metal that is at least semi-transparent, and the resin material comprises a translucent copolyester.

17. The panel system as recited in claim 16, wherein the mounting system comprises hardware that supports the one or more translucent resin panels as a sliding door.

18. The panel system as recited in claim 16, wherein the mounting system comprises hardware that supports the one or more resin panels as one or more of a ceiling, floor, wall, or partition.

* * * * *

UNITED STATES PATENT AND TRADEMARK OFFICE
CERTIFICATE OF CORRECTION

PATENT NO. : 9,097,015 B2  
APPLICATION NO. : 14/351061  
DATED : August 4, 2015  
INVENTOR(S) : Moore et al.

It is certified that error appears in the above-identified patent and that said Letters Patent is hereby corrected as shown below:

IN THE SPECIFICATION

Column 10  
Line 20, change "platens" to --plates--

Column 12  
Line 4, change "can occupies" to --can occupy--

Column 15  
Line 67, change "panels 100, 100a, 100b" to --panels 100a, 100b, 100c--

Column 16  
Line 19, change "large sized cells 106b" to --large sized cells 106a--  
Line 20, change "medium sized cells 106c" to --medium sized cells 106b--  
Line 20, change "small sized cells 106d" to --small sized cells 106c--

Column 17  
Line 45, change "simply position can position" to --simply position--

Signed and Sealed this  
Seventeenth Day of May, 2016

Michelle K. Lee  
*Director of the United States Patent and Trademark Office*